US006678131B2

(12) United States Patent
Chapman et al.

(10) Patent No.: US 6,678,131 B2
(45) Date of Patent: Jan. 13, 2004

(54) ARC-SAFE ELECTRICAL RECEPTACLES

(75) Inventors: William L. Chapman, Waynoka, OK (US); Anthony R. Carson, Waynoka, OK (US); Robert E. Redgate, Waynoka, OK (US)

(73) Assignee: RedGate Technologies, Inc., Stillwater, OK (US)

( * ) Notice: Subject to any disclaimer, the term of this patent is extended or adjusted under 35 U.S.C. 154(b) by 176 days.

(21) Appl. No.: 09/841,368

(22) Filed: Apr. 23, 2001

(65) Prior Publication Data

US 2002/0154461 A1 Oct. 24, 2002

(51) Int. Cl.[7] .................................................. H02H 3/00

(52) U.S. Cl. ............................. 361/42; 361/2; 361/103; 200/51.09

(58) Field of Search .......................... 361/42, 2, 3, 100, 361/103, 114; 200/51.09

(56) References Cited

U.S. PATENT DOCUMENTS 4,271,337 A * 6/1981 Barkas .................... 200/51.09
4,591,732 A * 5/1986 Neuenschwander ......... 307/140
5,841,617 A * 11/1998 Watkins et al. ............. 361/106

* cited by examiner

*Primary Examiner*—Gregory J. Toatley, Jr.
*Assistant Examiner*—James A Demakis
(74) *Attorney, Agent, or Firm*—Kenneth E. Darnell

(57) ABSTRACT

Electrical receptacles configured to eliminate arc faults rather than merely detect such faults with attendant circuit disconnection, the invention contemplates low-cost, child-safe electrical receptacles useful in residential situations and which can be fitted within the confines of single gang enclosures. The safety receptacles of the invention can be used in all use situations including both residential and industrial applications to increase safe use of electrical receptacles in residential applications in particular and to decrease industrial liabilities. In essence, the safety receptacles of the invention prevent arcing during insertion of a plug into the receptacle, during residence of the plug in the receptacle and during removal of the plug from the receptacle with a substantial load to the receptacle.

13 Claims, 6 Drawing Sheets

ARC-SAFE ELECTRICAL RECEPTACLES

BACKGROUND OF THE INVENTION

1. Field of the Invention

The invention relates to electrical receptacles configured to prevent dangerous arcing caused by movement of electrical current from its proper path to an improper path with sparking associated with such movement.

2. Description of the Prior Art

Various causes produce arc faults in electrical receptacles presently used in residential and industrial applications. Dangerous conditions are produced when arc faults occur, the arc being the result of sparking caused by movement of an electrical current from a proper path to an improper path. Recognition of the dangers inherent in the occurrence of arc faults has resulted in requirements in the National Electric Code for installation in appropriate locations of arc-fault circuit interrupting devices. Such devices are to be required especially in residential applications and particularly for bedroom circuits to prevent a major cause of death and injury due to fires caused by arc faults. Even though these arc-fault circuit interrupters are useful devices, it is to be understood that such devices do not fully address the problem of arcing in electrical receptacles since these devices only act to interrupt or disconnect a circuit once an arc is sensed. In other words, these devices do not prevent arc faults but merely disconnect the circuit in which the arc fault occurs on sensing of the arc fault. Since the arc fault still occurs in these prior devices, hazards are not eliminated completely but are simply rendered less likely to progress to a degree capable of causing damage and injury. The need has been long-felt in this art for low-cost electrical receptacles useful in both residential and industrial applications and which are particularly child-safe to prevent electrocution in the event a child or even someone other than a child inadvertently inserts a foreign object into an electrical receptacle with attendant dire consequences. This need in the art has further included the integration of an arc-eliminating structure into receptacles as small as single gang enclosures, thereby to permit realization of the advantages of arc elimination in electrical receptacles of all sizes and configurations. The present invention can be integrated into essentially all such electrical receptacles and configured to prevent arc faults during the time that a plug is inserted into and removed from a receptacle even with a substantial load to the receptacle.

SUMMARY OF THE INVENTION

The invention is embodied in electrical receptacles of varying type and description, the invention acting to provide low-cost safe receptacles which can be configured as child-proof for home use when integrated into single gang or similar enclosures. The invention can further be embodied in industrial receptacles to decrease the potential for the creation of hazardous conditions whether during normal use of a receptacle or inadvertent entry of extraneous matter into the receptacles such as can cause arcing in conventional receptacles.

In the several embodiments of the invention, receptacles are provided with a neutral input connecting to neutral external conductors. The "hot" side of the receptacle is provided with an input having external connectors, this input connecting to a switching device rather than directly to an output receiver "hot" side of a plug. A sensor disposed under the neutral receiver controls the switching device, a circuit thus formed necessarily completing itself before electricity can pass through to the "hot" side of the plug. Arcing associated with connection and disconnection under a high load is thereby eliminated.

The several concepts of the invention can be assembled in ways which will be apparent to those skilled in the art. As one example, the sensor can be installed on either the "hot" or groundside of a plug with the intent of the invention being realizable at least to some degree in either instance. A momentary switch is chosen as the switching device and is located at the neutral leg for ease of manufacture and accessibility. Placement of the sensor on the neutral side creates the necessity of having both hot and neutral inserted before an electrical flow can occur, thus eliminating the possibility of an arc and reducing the possibility of shock or electrocution to anyone inserting an electrically conductive material into the hot side of the plug. A neutral side sensor senses the presence of the prong of the plug and provides a contact closure which, in turn, allows an electrical flow through an energizer coil of a relay. The relay thus energizes and high-rated volt amp contacts allow a completion of the circuit where electrical flow to the "hot" side of the plug is established. A Quencharc circuit is disposed between the contacts to act as a fast-acting suppressor to remove arc associated with switching under load.

Accordingly it is a primary object of the invention to provide electrical receptacles configured to eliminate arc faults rather than merely detect arcing after arc initiation.

It is another object of the invention to provide electrical receptacles capable of residential and industrial use and configured to fit the volumetric confines of even a single gang enclosure and which acts to eliminate arc faults.

It is a further object of the invention to provide low-cost and safe electrical receptacles capable of eliminating arc faults during insertion into and removal of a plug from such receptacles when the receptacle is under a substantial load.

Further objects and advantages of the invention will become more apparent in light of the following detailed description of the preferred embodiments.

DESCRIPTION OF THE PREFERRED EMBODIMENTS

Figure 1:
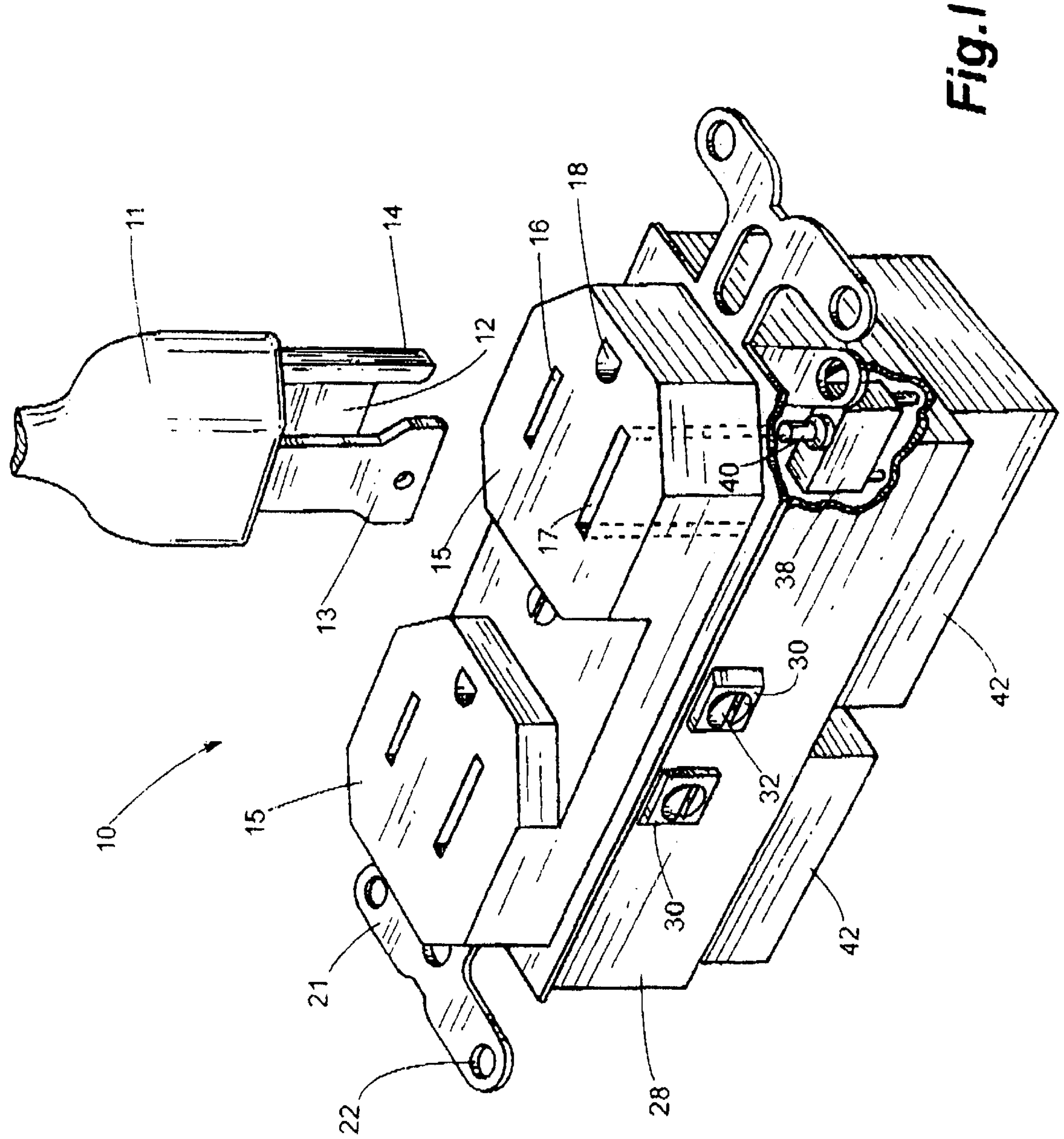
FIG. 1 is an idealized perspective view of an electrical receptacle configured according to the invention.
Figure 2:
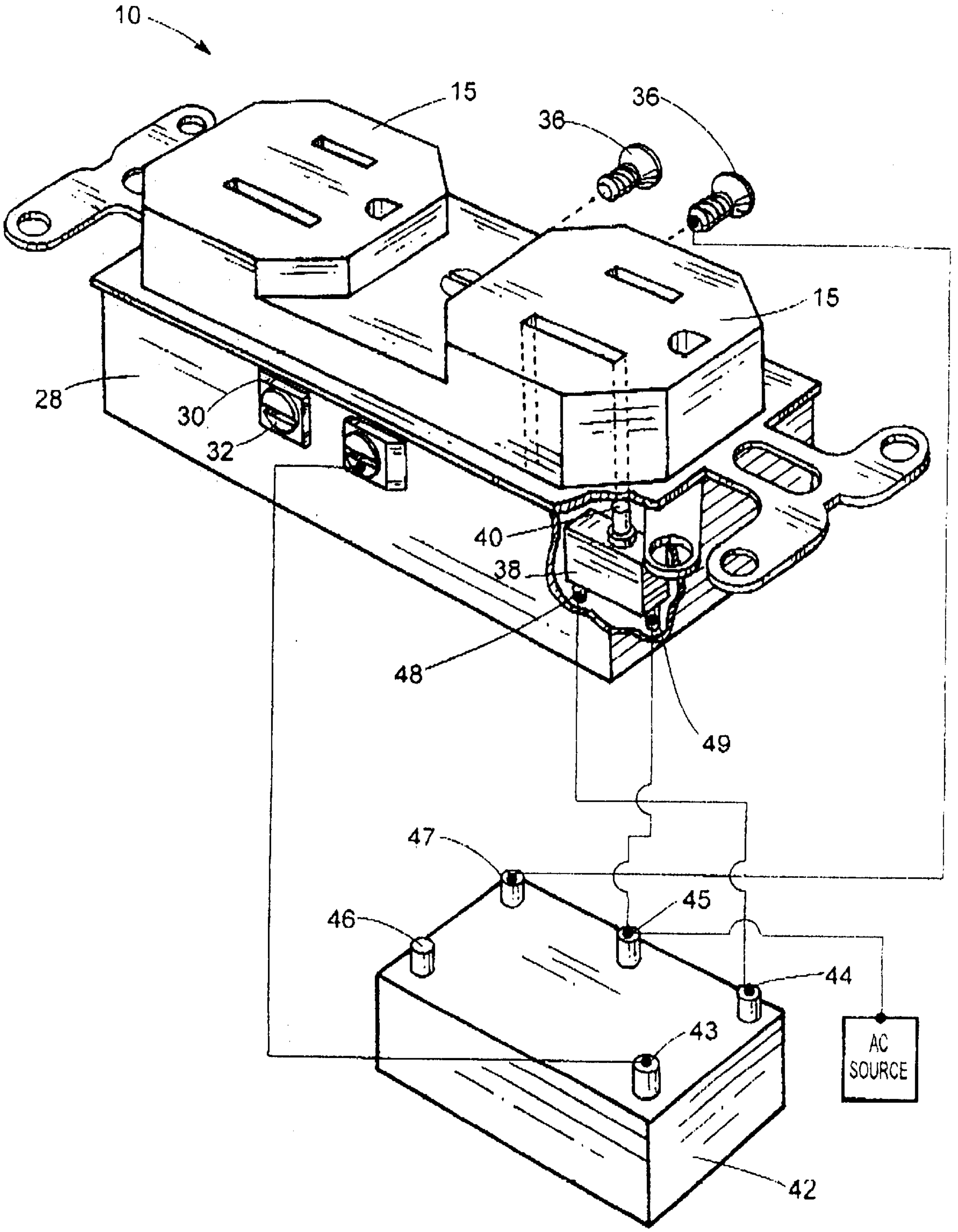
FIG. 2 is an elevational view of the receptacle of FIG. 1 with portions of the receptacle shown in exploded relation to other portions of the receptacle.
Figure 3:
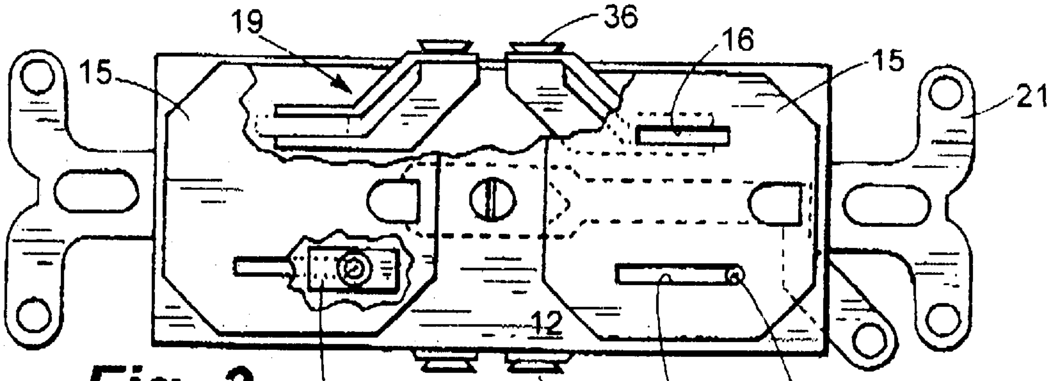
FIG. 3 is a plan view of the receptacle of FIG. 1.
Figure 4:
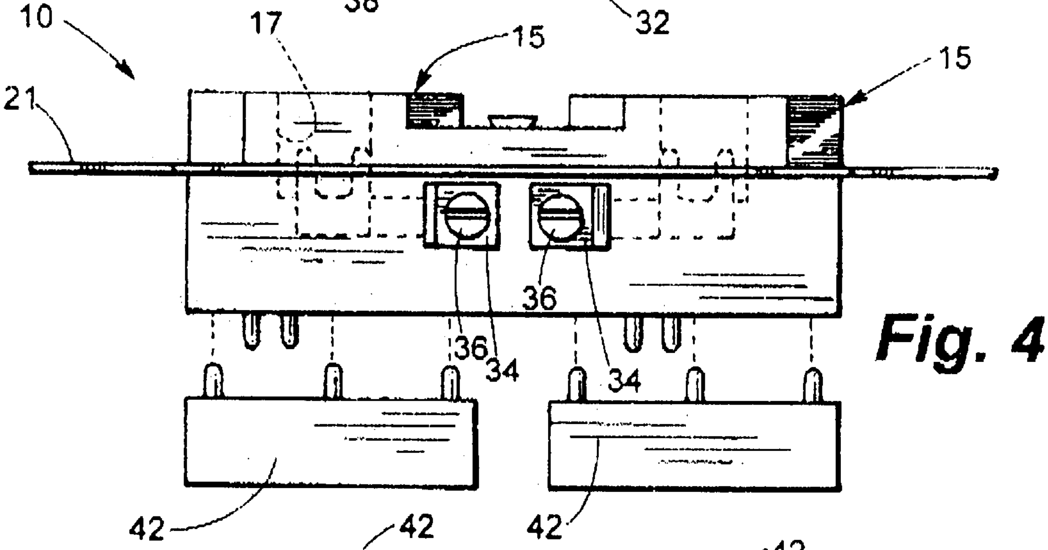
FIG. 4 is a side elevational view of the receptacle of FIG. 1.
Figure 5:
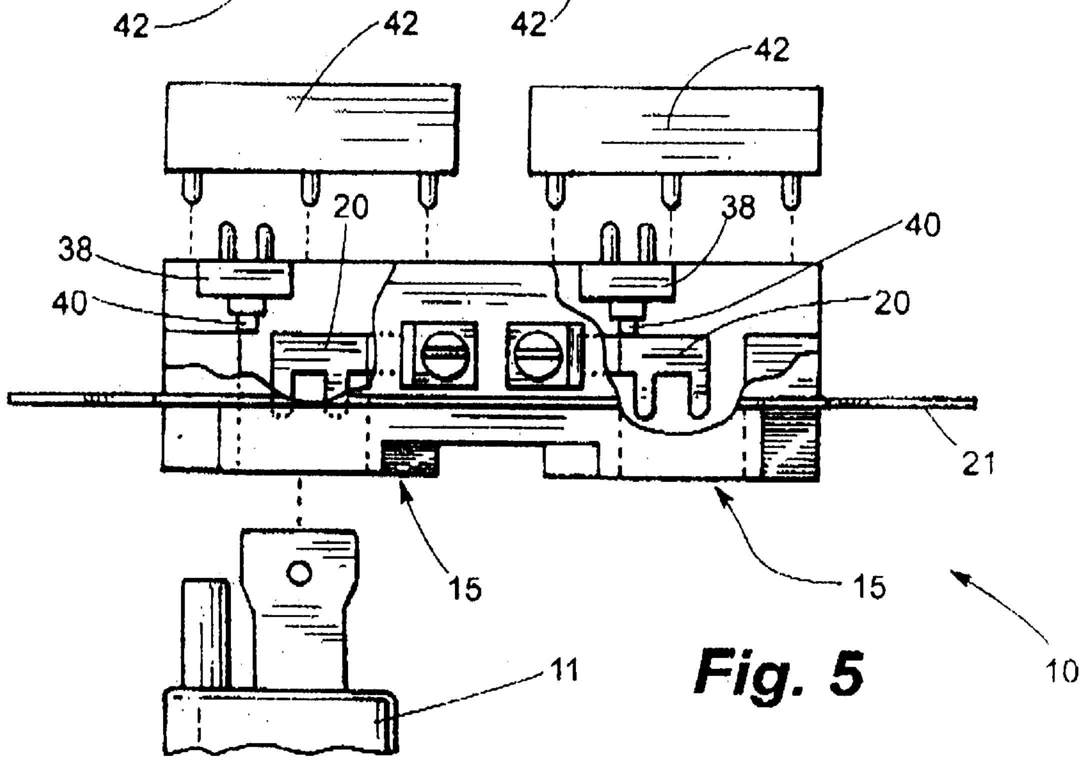
FIG. 5 is an exploded side elevational view of the receptacle of FIG. 1.
Figure 7:
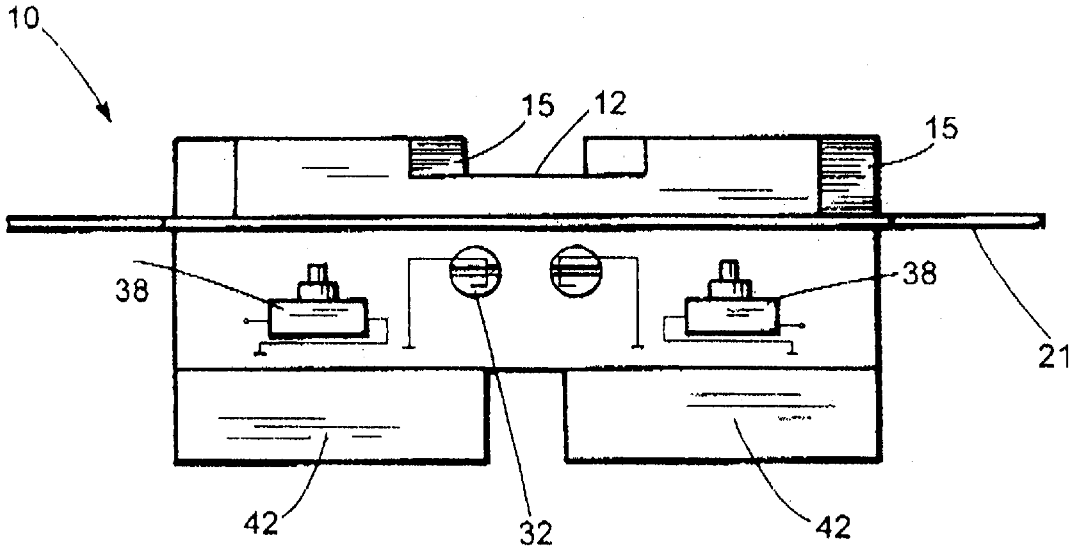
FIG. 7 is a schematic side elevational view.
Figure 6:
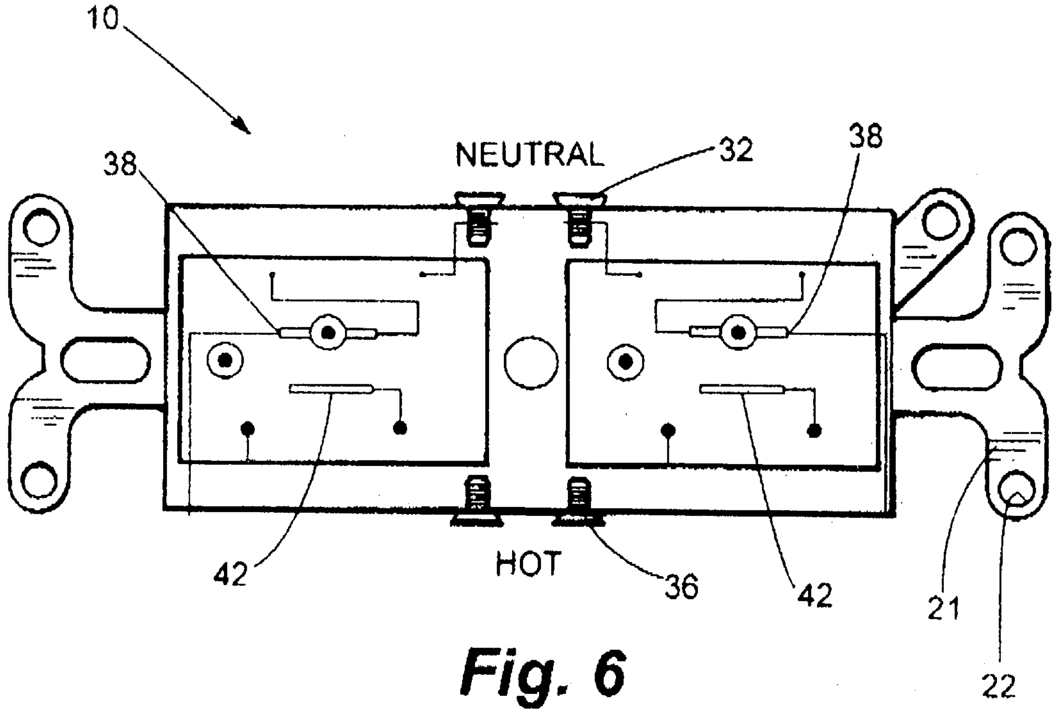
FIG. 6 is a schematic plan view of a portion of the receptacle with upper components removed.

Referring now to the drawings and particularly to FIGS. 1 through 3 which are idealized illustrations of the structure of a preferred embodiment of the invention and with further reference to FIGS. 4 through 7 which respectively show the structures of FIGS. 1 through 3 as idealized illustrations in FIGS. 4 and 5 and as schematic elevations in FIGS. 6 and 7, an electrical receptacle is seen to be subject to a load at least when a plug 1 resides conventionally in the receptacle 10, the load being applied in a conventional manner. The details of the load and of the plug 11 are not illustrated herein for convenience. The plug 11 is conventionally formed with hot, neutral and ground contacts respectively designated as hot contact 12, neutral contact 13 and ground contact 14. The receptacle 10 is provided with sockets 15 such as are conventionally provided in standard electrical receptacles and which are typically formed of a hard plastic according to Underwriters Laboratory ratings. The sockets 15 are conventionally provided with slots 16 and 17 configured according to standard practice in the art to respectively receive the hot contact 12 and the neutral contact 13 of the plug 11. Aperture 18 is conventionally provided to receive the ground contact 14 of the plug 11. Hot and neutral contact receivers 19 and 20 are disposed beneath the sockets 15 for electrically contacting in a conventional manner the contacts 12 and 13 respectively of the plug 11. The contact receivers 19 and 20 are best seen in FIGS. 4 and 5. The contacts 12, 13 and 14 as well as the contact receivers 19 and 20 are preferably formed of brass or copper according to Underwriters Laboratory ratings and are standard in electrical receptacles.

The receptacle 10 is provided with a mounting plate 23 having wing extensions 21 such as is conventional in the art for mounting of the receptacle 10 in a recessed position in a wall (not shown) or the like. Apertures 22 formed in the wing extensions 21 allow use of screws or similar fasteners to mount the receptacle 10 in a conventional manner.

In view of the foregoing, each of the sockets 15 can be said to be provided with one neutral contact receiver such as the receiver 20 and one hot contact receiver such as the receiver 19, the receivers 19, 20 being contacted respectively by the contacts 12, 13 of the plug 11 through the slots 16, 17 respectively. The sockets 15 are substantially standard at least as to the inclusion of the slots 16, 17, said slots 16, 17 providing entry into the socket 15 through which the contacts 12, 13 of a conventional plug such as the plug 11 are inserted to gain access to electrical power through the electrical receptacle 10. Ground within the receptacle 10 is provided in a conventional manner as at 50 by means of a conductive path from the aperture 22 to grounding. Such an expedient can be provided with a short length of conductive wire or the like which is held to ground by means of a screw and need not be described in detail herein.

Receptacle body 28 of substantially conventional design mounts the plate 23 and thus the sockets 15 as well as the hot and neutral contact receivers 19, 20. External neutral conductor plates 30 which essentially comprise externally disposed portions of the conductive material forming the neutral receivers 20 are mounted by screws 32 to the receptacle body 28 in a substantially conventional fashion except that the plates are typically connected together in a standard receptacle. In the present receptacle 10, the plates 30 are not electrically or mechanically joined together so that the sockets 15 are isolated electrically from each other. The "hot" side of the receptacle body 28 is similarly configured with hot conductor plates 34 particularly being separate and held to the receptacle body 28 by means of screws 36.

Each of the sockets 15 are provided with momentary switches 38 which are housed within the receptacle body 28, FIGS. 1 and 2 only showing one of the switches 38 for ease of illustration. Switch actuator pin 40 is disposed in alignment with the neutral contact receiver 20 and is pushed downwardly to actuate the switch 38 on insertion of the neutral contact 13 into the slot 17 in the socket 15. The presence of the plug 11 inserted into one of the sockets 15 is thus "sensed" by the switch actuator pin 40 to actuate the switch 38 to function in concert with one of the relays 42 to which the switch 38 is electrically connected. It is to be understood that each socket 15 is provided with one of the switches 38 and one of the relays 42 and that each socket 15 functions independently.

The relays 42 are mounted one each to the receptacle body 28 on opposite sides of the body 28 from each of the sockets 15. As is conventional in the art, each relay 42 is provided with coils (not shown) connected electrically to pins 43, 44. Each of the relays 42 is provided with a common terminal at pin 45 while terminal pins 46, 47 are also provided on each relay 42. Pin 43 is connected electrically to the neutral input of the receptacle 10 such as through the screws 32 which mount the neutral conductor plates 30 to the receptacle body 28. Pin 44 electrically joins to switch pin 48 of the switch 38 while the common terminal pin 45 electrically connects to switch pin 49 of the switch 38. Line hot input is made to the switch pin 49 of the switch 38 and to the common terminal pin 45 of the relay 42 through the AC source. The switch pin 47 is connected electrically to the "hot" side of the receptacle body 28 through one each of the screws 36 which hold the hot connector plates 34 to the receptacle body.

As can be seen in FIG. 3, the tips of the switch actuator pins 40 can be seen through the slots 17 of the sockets 15 while conventional electrical contact structure associated with the hot conductor plates 40 can be seen through the slots 16 of the sockets 15. Insertion of the plug 11 into one of the sockets 15 as best seen in FIG. 5 causes the switch actuator pin 40 to be depressed and thus to actuate the switch 38. Closure of the switch 38 allows voltage to energize the coils (not shown) of the relay 42 from the output of the hot line input on pin 48 of the switch 38. When the coil (not shown) of the relay 42 is energized, the common terminal pin 45 and the relay 42 connects to the terminal pin 47 of the relay, thereby allowing line hot input from the common terminal pin 45 to flow out of the pin terminal 47 of the relay 42 to the hot side of the receptacle 10.

When the switch 38 is open, that is, the plug 11 is not sensed by the switch 38, the coil (not shown) of the relay 42 will not be energized and the common terminal pin 45 of the relay 42 will be connected to the terminal pin 46 of the relay 42, which pin 46 has nothing electrically connected to it. Voltage will therefore not be present at either the hot side or the terminal pin 47 of the relay 42.

Referring further now to FIGS. 6 and 7, a general description of the invention can be provided for additional reference to the manner by which the invention finds utility in a variety of applications and with conventional structure. As an example, a "neutral" input can be provided by connection to either screw or mechanical neutral external connectors conventionally provided on a plug such as the plug 11. As can also be readily seen, the "hot" side of the receptacle 10 communicates through the hot contact receiver 19 of each of the sockets 15, input being through external connectors which can be either screw or mechanical fasteners as is known to be conventional in the art. The circuitry thus provided herein assures that a circuit which is to be formed by insertion of contacts of a plug into the receptacle 10 must complete itself before electricity is allowed to pass through to the "hot" side of the plug, thereby eliminating arcing associated with connecting and disconnecting of a plug with the receptacle 10 under a high load.

The hot contact 12 of the plug 11 will pass through to a load without interference from the receptacle 10 of the invention. The neutral contact 13 of the plug 11 will pass through the switch 38 which is controlled by the actuator pin 40 from the neutral side of the receptacle 10. Ground will pass through the receptacle 10 to a load as a safety ground in a conventional manner which meets all Underwriters Laboratory rating requirements.

The contacts 12, 13 of the plug 11 respectively make contact with the electrical contact receivers 19, 20 without electrical flow occurring. After the contacts 12, 13 are inserted all the way into the receptacle 10 and contact has been established to the electrical contact receivers 19, 20, the actuator pin 40 senses the presence of the plug 11 and signals the switch 38 to provide the switching function which permits electrical flow through the circuit. The moment the plug begins to be removed from the receptacle 10, the actuator pin 40 signals the switch 38 such that the switch 38 produces a switching function to disconnect electrical flow prior to the contacts 12, 13 leaving the electrical contact receivers 19, 20, thereby eliminating any arc at the receivers 19, 20.

Figure 8:
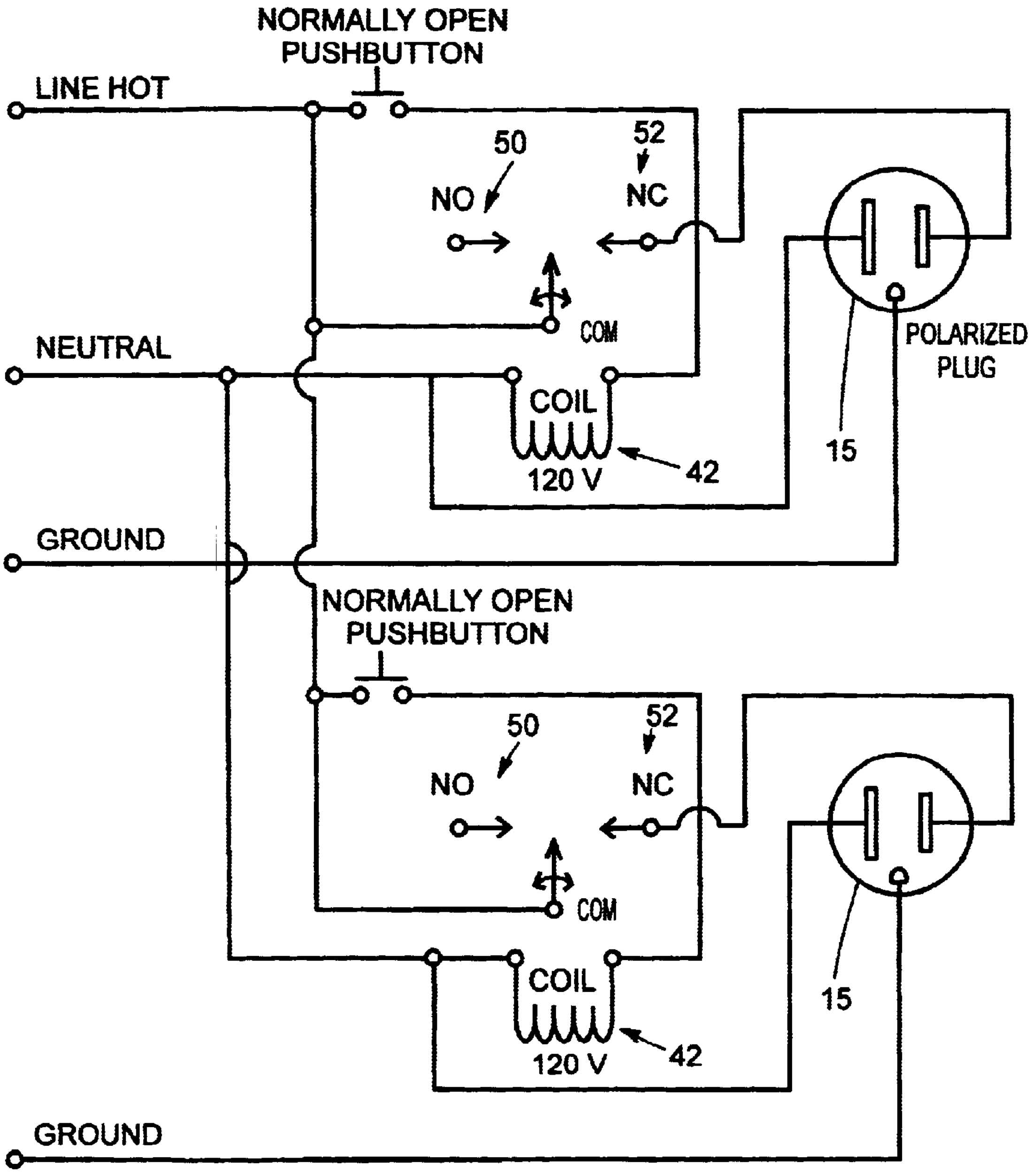
FIG. 8 is a detailed schematic of the receptacle.
Figure 9:
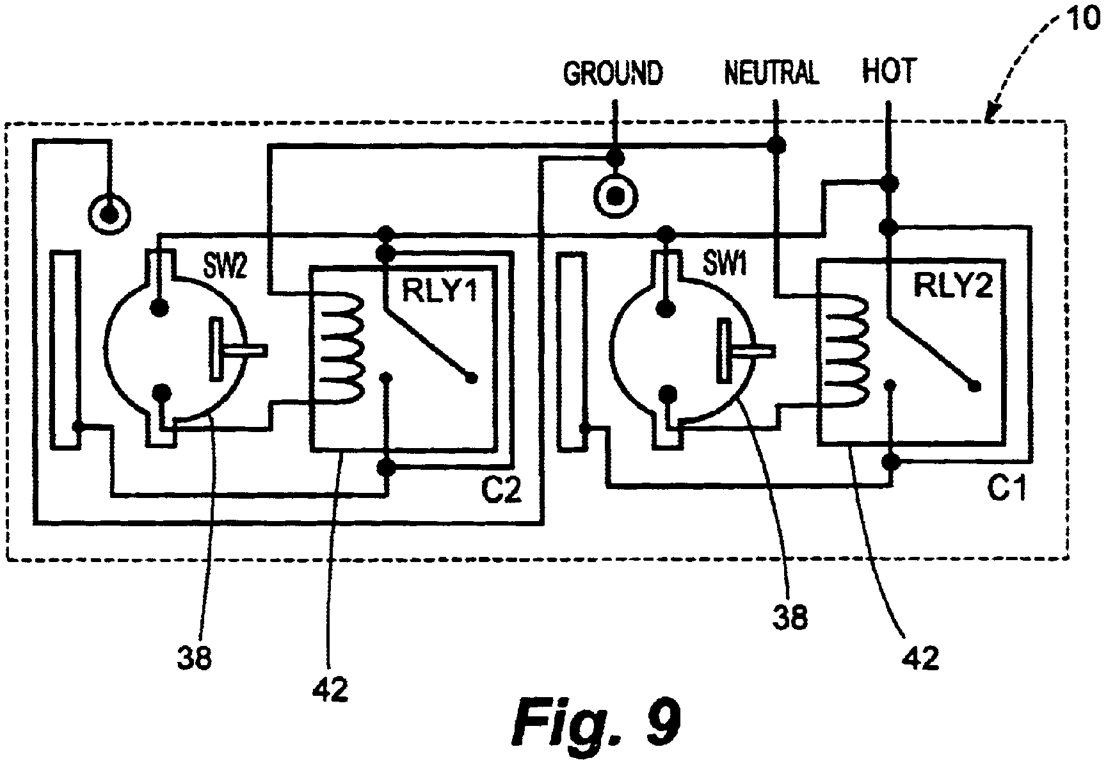
FIG. 9 is a simplified schematic of an electrical receptacle configured according to the invention.

The switch 38 is preferably located on the neutral side of the receptacle 10, and can take the form of a number of different sensing devices and can be placed within the receptacle 10 in a number of locations to provide the necessary function. A switch preferably employed takes the form of a 0.5A momentary switch which is mounted under the neutral input electrical contact receiver 20 in concert with the actuator pin 40 which protrudes above the base of the receiver 20. When the contacts 12, 13 of the plug 11 are inserted into the receptacle 10, the neutral contact 13 comes into contact with the actuator pin 40 and "signals" the switch 38 to operate if the plug 11 is fully inserted into one of the sockets 15 of the receptacle 10. A momentary switch such as can conveniently be employed is formed of hard plastic and has electrical contactors which can be formed of a conductive material capable of passing Underwriters Laboratory ratings for high voltage, low amperage implementation. The actuator pin 40 is preferably formed of a non-conductive hard plastic and is the mechanism for establishment of contact with the inserted neutral contact 13 of the plug 11 on the neutral side. The travel and normally open NO and normally closed NC positions at 50 and 52 respectively can vary according to particular design, the circuit so disclosed being also seen in FIGS. 8 and 9 as will be referenced relative to the following discussion in addition to the drawings referred to above. Since the actuator pin 40 is formed of a non-conductive material, the receptacle "hot" is not present when the plug 11 is not present. If a metallic conductor is inserted on the hot side of the receptacle 10 and the actuator pin 40 does not sense the presence of a plug contact on the neutral side, then voltage is not present in the receptacle 10. Risk of shock is thereby greatly reduced and arc associated with the connection and disconnection of a load is essentially eliminated. In the event that a metallic conductor is inserted in both of the sockets 15 of the receptacle 10 and are tied together, a closed short will occur and will trip a conventional breaker used as a safety device in a conventional manner for the receptacle 10. However, in no event shall an arc occur at the receptacle 10.

The relays 42 preferably take the form of 15A relays which are electrically connected to the switch 38. Such relays can have any number of pins. The five-pin relay shown in the drawings as the relay 42 has a fifth pin which can be used to operate a signal generator such as a light source or an auditory source which would provide an audible signal. The relay 42 provides a contact opening and closure according to the position of the switch 38, that is, the momentary switch in a preferred embodiment. It is to be understood that a number of different devices are known in the art which can be used to provide an open or closed circuit, such devices including conventional triacs, transistors and the like. However, the relay 42 as shown provides optimum cost and size solutions as the circuit element choice for the switching function.

When the plug 11 is inserted into the receptacle 10, the neutral contactor side of the receptacle as noted above senses the presence of the neutral contact 13 of the plug 11 through operation of the momentary switch 38. The normally open NO position of the switch 38 then switches to closed and provides a voltage through an energizer coil (not shown) of the relay 42. When the NO relay coil is energized, the relay 42 switches contactors to a closed position and provides power to the receptacle, thereby eliminating any arc at the receptacle 10. As noted in the drawings, this condition allows power to be on only when the momentary switch 38 senses the presence of neutral contact 13 of the plug 11 when inserted into the receptacle 10. When the contact 13 is not sensed, the momentary switch 38 does not sense the presence of a contact and power is not introduced to the receptacle 10 through a load. Accordingly, power is not introduced into the receptacle 10 until the presence of a contact is sensed by the switch 38.

It is to be understood that the invention can be configured other than as explicitly described herein, the scope of the invention being defined by the definitions provided by the appended claims.

What is claimed is:

1. An electrical receptacle configured to eliminate arc faults on insertion into and removal of a plug from the receptacle when the receptacle is under load, the plug having a neutral contact and a hot contact, comprising:

neutral and hot receivers for respectively receiving the neutral contact and the hot contact of the plug, the neutral contact passing through the neutral receiver to the load;

a switch to which the hot contact connects; and, a means for sensing the presence of the neutral contact in the receptacle and for controlling the switch to cause the switch to establish electrical flow when the neutral contact is sensed.

2. The receptacle of claim 1 wherein the switch comprises a relay.

3. The receptacle of claim 1 wherein the sensing means comprises a momentary switch.

4. The receptacle of claim 1 wherein the switch comprises a triac.

5. The receptacle of claim 1 wherein the switch comprises a transistor.

6. The receptacle of claim 1 and further comprising a means for quenching arc within the relay.

7. The receptacle of claim 1 and further comprising means for quenching arc within the switch.

8. An electrical receptacle configured to eliminate arc faults on insertion into and removal of a plug from the receptacle when the receptacle is under load, the plug having a neutral contact and a hot contact, comprising:

neutral and hot receivers for respectively receiving the neutral contact and the hot contact of the plug, the neutral contact passing through the neutral receiver to the load;

a relay to which the hot contact connects;

means for sensing the presence of the neutral contact in the receptacle and for controlling the relay to cause the relay to establish electrical flow when the neutral contact is sensed; and, means for quenching arc within the relay.

9. The electrical receptacles of claim 8 wherein the sensing means comprises a momentary switch.

10. The receptacle of claim 6 wherein the quenching means comprise selenium stacks.

11. The receptacle of claim 1 and further comprising means for quenching arc within the switch.

12. An electrical receptacle configured to eliminate arc faults on insertion into and removal of a plug from the receptable when the receptacle is under load, the plug having a neutral contact and a hot contact, comprising:

neutral and hot receives for respectively receiving the neutral contact and the hot contact of the plug, the neutral contact passing through the neutral receiver to the load;

a relay to which the hot contact connects;

means for sensing the presence of the neutral contact in the receptacle and for controlling the relay to cause the relay to establish electrical flow when the neutral contact is sensed; and means for quenching arc within the relay.

13. The electrical receptacle of claim 12 wherein the sensing means comprises a momentary switch.

* * * * *